US007298284B2

(12) United States Patent
Glime

(10) Patent No.: US 7,298,284 B2
(45) Date of Patent: Nov. 20, 2007

(54) EDUCATIONAL TOY CLOCK

(75) Inventor: James A. Glime, Bloomfield, MI (US)

(73) Assignee: JAAG Plush, LLC, Madison Heights, MI (US)

(*) Notice: Subject to any disclaimer, the term of this patent is extended or adjusted under 35 U.S.C. 154(b) by 225 days.

(21) Appl. No.: 11/236,282

(22) Filed: Sep. 27, 2005

(65) Prior Publication Data

US 2007/0069910 A1     Mar. 29, 2007

(51) Int. Cl.
*G08B 3/00*     (2006.01)
(52) U.S. Cl. .............................. 340/691.1; 340/309.15; 446/175
(58) Field of Classification Search ............... 340/691, 340/309.15; 446/175
See application file for complete search history.

(56) References Cited

U.S. PATENT DOCUMENTS

| 3,994,078 | A |   | 11/1976 | Liu |
| 4,730,284 | A | * | 3/1988 | Adams ........................ 368/72 |
| 4,742,500 | A |   | 5/1988 | Luce |
| 4,834,657 | A |   | 5/1989 | Gonzalez et al. |
| 4,895,393 | A | * | 1/1990 | Shimizu ..................... 281/15.1 |
| D318,311 | S |   | 7/1991 | Chen |
| 5,044,961 | A |   | 9/1991 | Bruskewitz |
| 5,059,149 | A |   | 10/1991 | Stone |
| D324,075 | S |   | 2/1992 | Leung |
| 5,114,376 | A |   | 5/1992 | Copley et al. |
| D336,856 | S |   | 6/1993 | Chen |
| D359,918 | S |   | 7/1995 | McGuire et al. |
| 5,570,325 | A |   | 10/1996 | Arpadi |
| 5,684,758 | A |   | 11/1997 | Gray et al. |
| 5,807,112 | A |   | 9/1998 | Zeck |
| 5,807,155 | A |   | 9/1998 | Divvleeon |
| 5,888,117 | A |   | 3/1999 | Sutton |
| 6,048,209 | A |   | 4/2000 | Bailey |
| 6,190,227 | B1 | * | 2/2001 | Oba ............................ 446/81 |
| 6,560,802 | B2 |   | 5/2003 | Fujii |
| D495,522 | S |   | 9/2004 | Sanchez |
| 6,997,772 | B2 | * | 2/2006 | Fong .......................... 446/175 |

* cited by examiner

*Primary Examiner*—Daryl C Pope
(74) *Attorney, Agent, or Firm*—Dickinson Wright, PLLC

(57) ABSTRACT

A toy clock (22) and stuffed animal combination includes a body (24) supporting a clock (22) defining a timer for setting a time period of for disciplinary action. A first leg (26) extends from the body (24) to a first bottom (28) and a second leg (30) extends from the body (24) to a second bottom (32). A start message including TIME OUT is disposed on the first bottom (28) for indicating the beginning of the time period and an end message including TIME'S UP is disposed on the second bottom (32) for indicating the termination of the time period. Two flaps (38) are movable between a start position covering the TIME'S UP (36) at the beginning of the time period and an end position covering the TIME OUT (34) at the termination of the time period.

15 Claims, 4 Drawing Sheets

EDUCATIONAL TOY CLOCK

BACKGROUND OF THE INVENTION

1. Field of the Invention

An educational toy clock assembly of the type for setting a disciplinary punishment period of time.

2. Description of the Prior Art

Various educational toy clock assemblies are known in the form of a stuffed animal combined with a clock timer. Such a stuffed animal includes a body and leg appendages extending from the body, with the clock being supported on the body and accessible for manually setting a time period. A start indicator is disposed on the body for indicating the beginning of the time period and an end indicator is disposed on the body for indicating the termination of the time period.

Examples of such prior art assemblies are shown in U.S. Pat. No. 3,994,078 to Liu; U.S. Pat. No. 4,742,500 to Luce; U.S. Pat. No. 5,114,376 to Copley et al.; U.S. Pat. No. 5,684,758 to Gray et al.; Des. U.S. Pat. No. 324,075 to Leung and Des. U.S. Pat. No. 336,856 to Chen. At least one U.S. Pat. No. D495,522 to Sanchez has used the script TIME OUT while another U.S. Pat. No. 6,560,802 to Fujii has placed a timer and display on the distal end of a foot of a stuffed animal instead of being placed on the body.

SUMMARY OF THE INVENTION AND ADVANTAGES

The educational toy clock of the subject invention includes a start indicator on the body for indicating the beginning of the time period and an end indicator on the body for indicating the termination of the time period. However, the invention is distinguished by at least one cover movable between a start position for covering the end indicator at the beginning of the time period and an end position for covering the start indicator at the termination of the time period.

In an alternative expression of the invention the start indicator includes a start script permanently presenting a start message including TIME OUT disposed on a first appendage for indicating the beginning of the time period and the end indicator includes an end script permanently presenting an end message including TIME'S UP disposed on the second appendage for indicating the termination of the time period without a cover for covering the messages.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
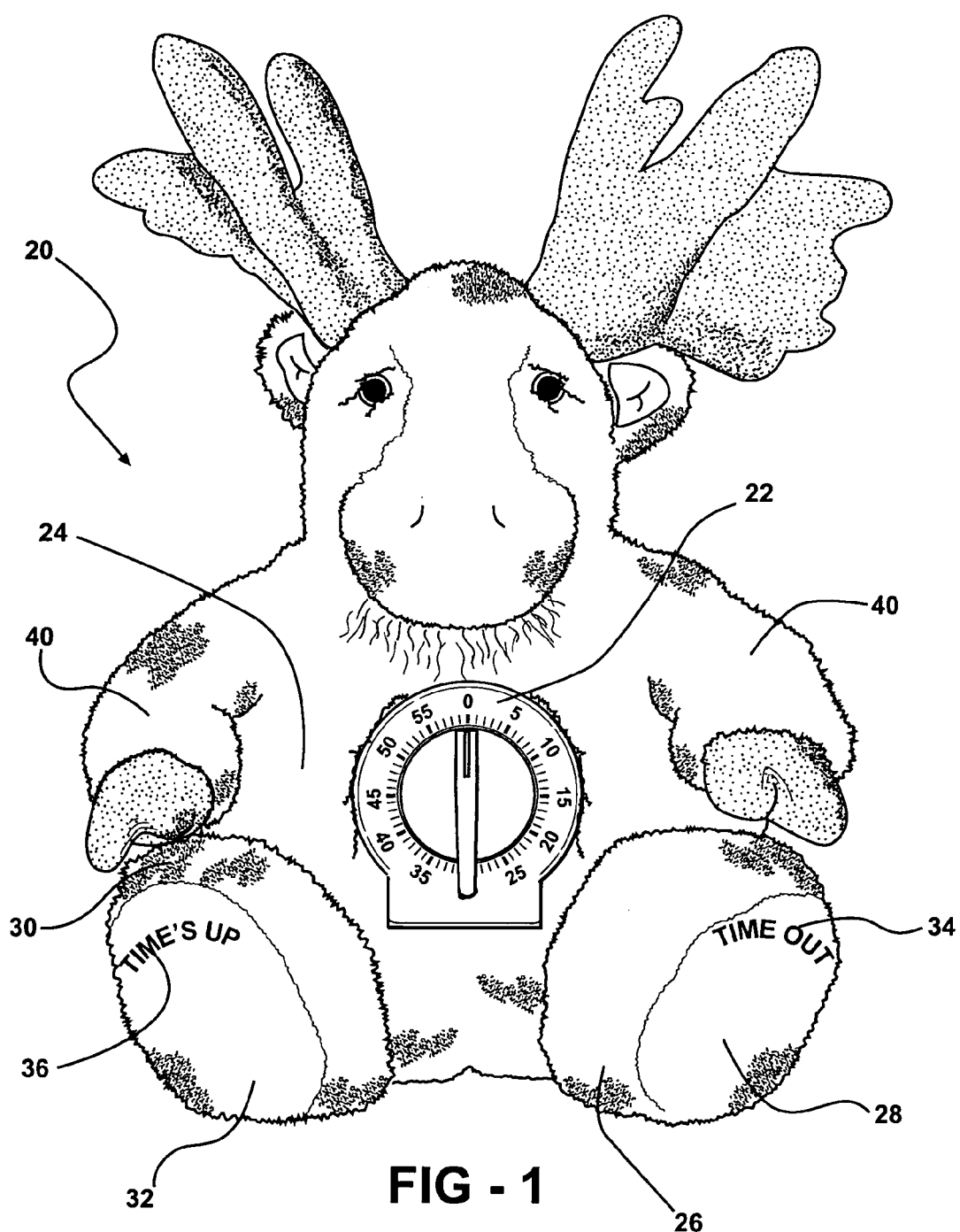
FIG. 1 is an elevational view showing the assembly in a non-use mode.
Figure 2:
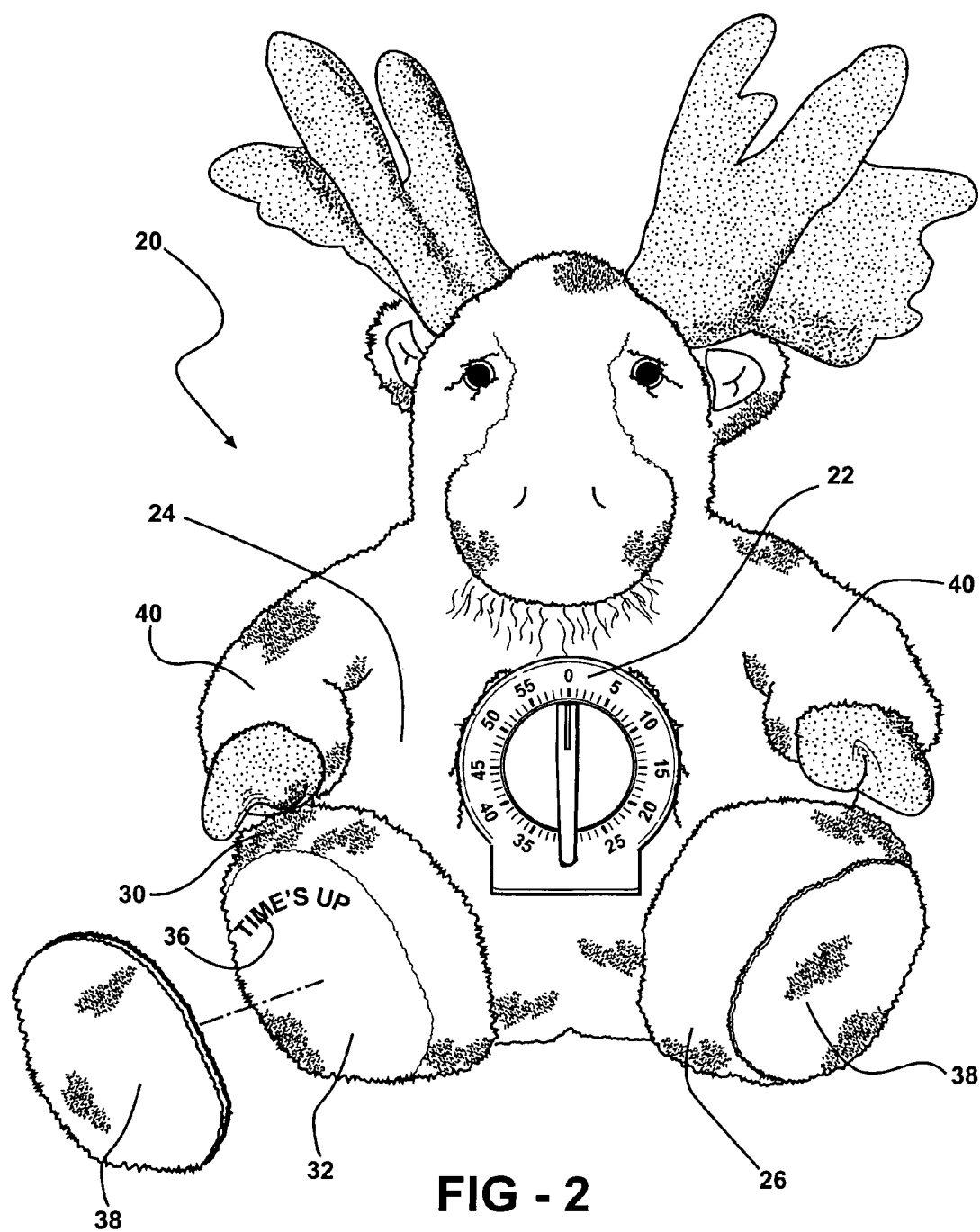
FIG. 2 is a view like FIG. 1 but with a flap in an exploded view position.
Figure 3:
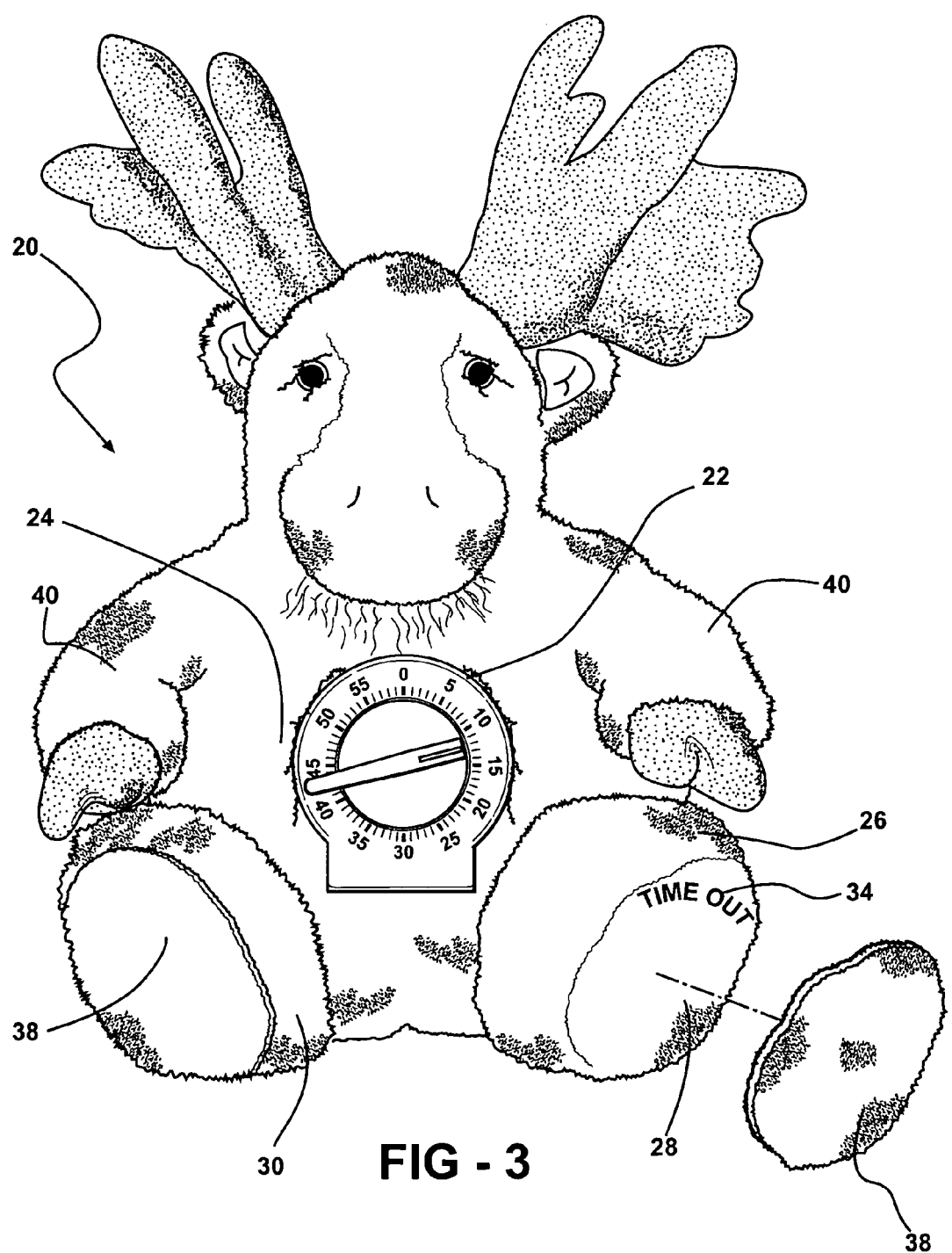
FIG. 3 is a view like FIG. 2 but showing the first flap on the bottom of the first leg and a second flap in an exploded view position.
Figure 4:
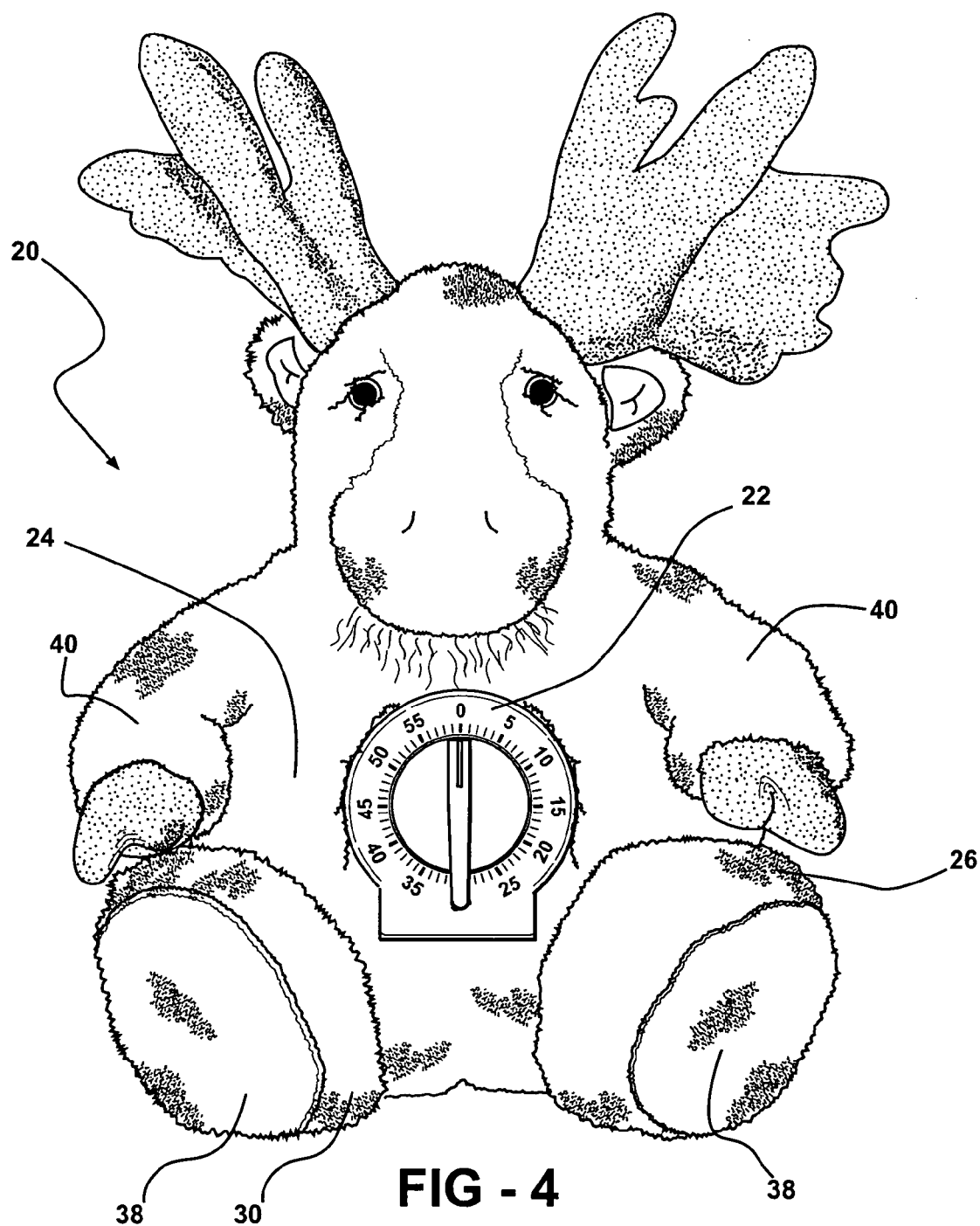
FIG. 4 is a view like FIG. 3 but showing both flaps disposed over the bottoms of the legs.

Referring to the Figures, an educational toy clock assembly 20 is generally shown. The assembly is a toy clock 22 and stuffed animal wherein the stuffed animal includes a body 24 supporting a clock 22 defining a timer for setting a time period of for disciplinary action or inaction, e.g., confinement.

A first appendage 26 defining a first leg 26 extends from the body 24 to a first distal extremity 28 that presents a first bottom 28. Similarly, a second appendage defining a second leg 30 extends from the body 24 to a second distal extremity 32 that presents a second bottom 32.

A start indicator 34 on the body 24 includes a start script 34 permanently presenting a start message including TIME OUT disposed on the first bottom 28 of the first appendage 26 for indicating the beginning of the time period.

An end indicator 36 on the body 24 includes end script 36 permanently presenting an end message including TIME'S UP disposed on the second bottom 32 of the second appendage for indicating the termination of the time period.

At least one cover defined by a flap 38, two flaps 38 as illustrated, is included for disposition over the bottoms. The flaps 38 are movable between a start position for covering the end message including TIME'S UP at the beginning of the time period and an end position for covering the start message including TIME OUT at the termination of the time period.

The bottoms present equal areas and each flap 38 comprises a flexible sheet presenting an area substantially equal to the area of each of the bottoms. A holding system is included for holding each flap 38 to either of the bottoms. Although the flaps 38 may be attached to the bottoms by a chord, or the like, in the preferred embodiment the bottoms of the legs 26, 30 and the inside of the flaps 38 have mating Velcro components.

Of course the stuffed animal may emulate a wide variety of actual animals or original characters. The start script 34 and the end script 36 are presented on the rear legs 26, 30 of the stuffed animal they may also be presented other front limbs or arms 40. In fact, the start and end indicators may be disposed in any convenient place on the stuffed animal to be covered by a removable cover.

Obviously, many modifications and variations of the present invention are possible in light of the above teachings. The invention may be practiced otherwise than as specifically described within the scope of the appended claims, wherein that which is prior art is antecedent to the novelty set forth in the "characterized by" clause. The novelty is meant to be particularly and distinctly recited in the "characterized by" clause whereas the antecedent recitations merely set forth the old and well-known combination in which the invention resides. These antecedent recitations should be interpreted to cover any combination in which the incentive novelty exercises its utility. In addition, the reference numerals in the claims are merely for convenience and are not to be read in any way as limiting.

ELEMENT LIST

| Element Symbol | Element Name |
| --- | --- |
| 20 | clock assembly |
| 22 | clock |

-continued

ELEMENT LIST

| Element Symbol | Element Name |
| --- | --- |
| 24 | body |
| 26 | first leg |
| 28 | first distal extremity |
| 30 | second leg |
| 32 | second distal extremity |
| 34 | start script |
| 36 | end script |
| 38 | flap |
| 40 | arms |

What is claimed is:

1. An educational toy clock assembly (20) comprising;
a body (24),
appendages extending from said body (24),
a clock (22) supported by said body (24) for setting a time period,
a start script (34) permanently presenting a start message on said body (24) for indicating the beginning of the time period,
an end script (36) permanently presenting an end message on said body (24) for indicating the termination of the time period, and
characterized by at least one cover movable between a start position for covering said end indicator (36) at the beginning of the time period and an end position for covering said start indicator (34) at the termination of the time period.

2. An assembly as set forth in claim 1 wherein said start script (34) presents TIME OUT and said end script (36) presents TIME'S UP.

3. An assembly as set forth in claim 1 wherein said start script (34) is disposed on a first appendage (26) and said end script (36) is disposed on a second appendage.

4. An assembly as set forth in claim 1 wherein said appendages extend from said body (24) to distal extremities (28, 32) and said start script (34) is disposed on a first distal extremity (28) and said end script (36) is disposed on a second distal extremity (32).

5. An assembly as set forth in claim 4 wherein said start script (34) is disposed on a first appendage (26) and said end script (36) is disposed on a second appendage.

6. An assembly as set forth in claim 5 wherein said first distal extremity (28) defines a first leg (26) and said first distal extremity (28) presents a first bottom (28) and said second distal extremity (32) defines a second leg (30) and said second distal extremity (32) presents a second bottom (32), said start script (34) being disposed on said first bottom (28) and said end script (36) being disposed on said second bottom (32).

7. An assembly as set forth in claim 6 wherein said cover includes at least one flap (38) for disposition over said bottoms.

8. An assembly as set forth in claim 7 including a holding system for holding said flap (38) to said bottoms.

9. An assembly as set forth in claim 8 wherein said flap (38) comprises a flexible sheet.

10. An assembly as set forth in claim 9 wherein said bottoms present equal areas and said flap (38) presents an area substantially equal to the area of each of said bottoms.

11. An assembly as set forth in claim 1 wherein said body (24) and said appendages define a stuffed animal.

12. An assembly as set forth in claim 1 wherein said clock (22) comprises a timer.

13. An educational toy clock assembly (20) comprising;
a body (24),
a first appendage and a second appendage extending from said body (24),
a clock (22) supported by said body (24) for setting a time period, and
characterized by a start indicator on said body including start script permanently presenting a start message including TIME OUT disposed on said first appendage for indicating the beginning of the time period and an end indicator on said body including end script permanently presenting an end message including TIME'S UP disposed on said second appendage for indicating the termination of the time period.

14. An educational toy clock assembly (20) as set forth in claim 13 including at least one cover movable between a start position for covering said end message including TIME'S UP at the beginning of the time period and an end position for covering said start message including TIME OUT at the termination of the time period.

15. An educational toy-clock stuffed-animal assembly comprising;
a body,
a clock defining a timer supported by said body for setting a time period,
a first appendage defining a first leg extending from said body to a first distal extremity presenting a first bottom,
a second appendage defining a second leg extending from said body to a second distal extremity presenting a second bottom,
a start indicator on said body including start script permanently presenting a start message including TIME OUT disposed on said first bottom of said first appendage for indicating the beginning of the time period,
an end indicator on said body including end script permanently presenting an end message including TIME'S UP disposed on said second bottom of said second appendage for indicating the termination of the time period,
at least one cover defined by a flap for disposition over said bottoms and movable between a start position for covering said end message including TIME'S UP at the beginning of the time period and an end position for covering said start message including TIME OUT at the termination of the time period,
said bottoms present equal areas and said flap is a flexible sheet presenting an area substantially equal to the area of each of said bottoms, and
a holding system for holding said flap to said bottoms.

* * * * *